W. H. HOPE.
Vegetable, Fruit, and Meat Cutter.
No. 26,991.
Patented Jan'y 31, 1860.
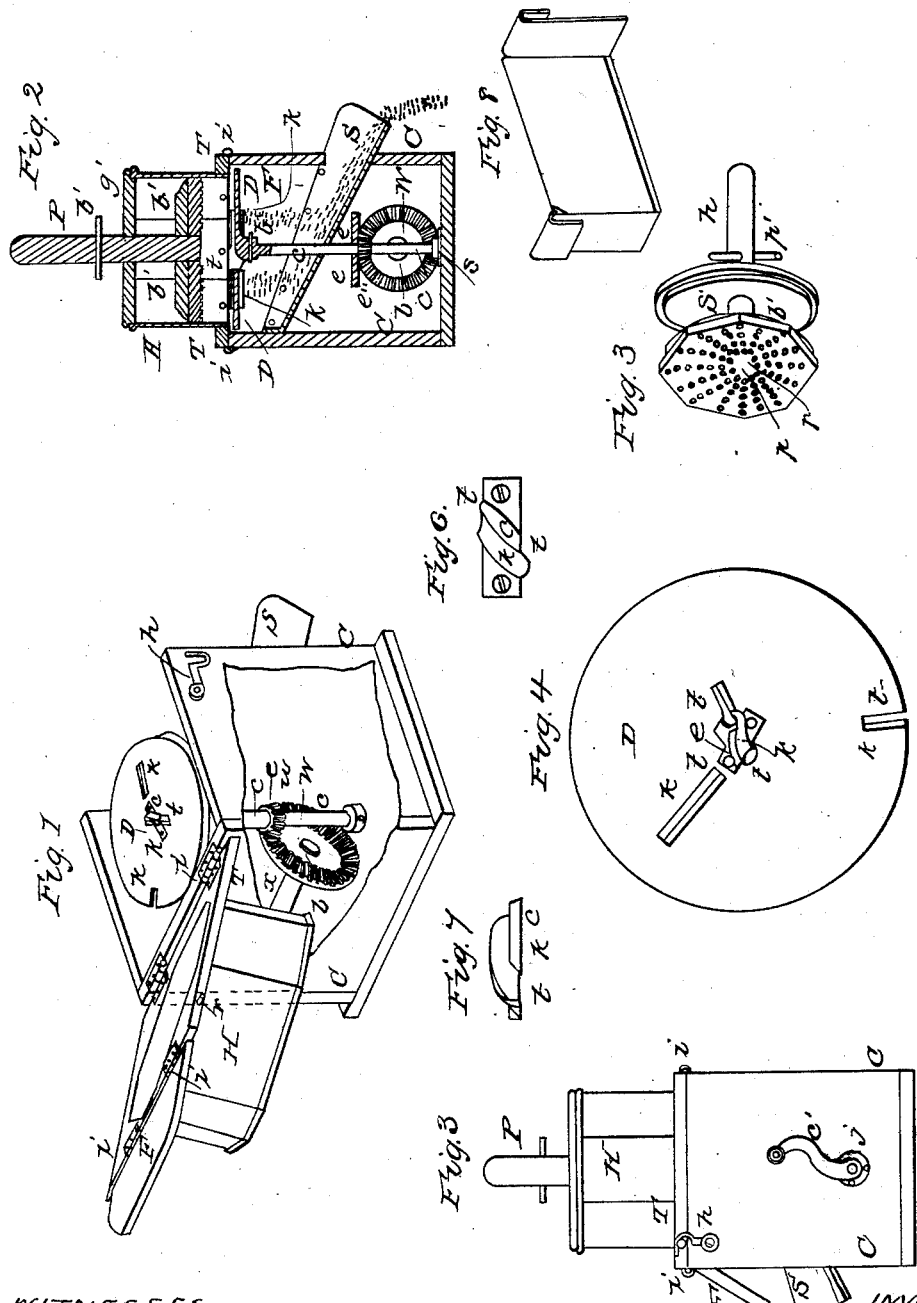
WITNESSES
INVENTOR

UNITED STATES PATENT OFFICE.

WM. H. HOPE, OF WASHINGTON, DISTRICT OF COLUMBIA.

REVOLVING CUTTER, ICE-SHAVER, &c.

Specification of Letters Patent No. 26,991, dated January 31, 1860.

*To all whom it may concern:*

Be it known that I, WM. H. HOPE, of Washington, in the county of Washington and District of Columbia, have invented new Improvements in the Modes of Cutting Ice, Vegetables, Meats, and Fruits; and I do hereby declare that the following is a full and exact description thereof, reference being had to the accompanying drawings and to the letters of reference marked thereon.

To enable others skilled in the art to make and use my invention I will proceed to describe its construction and operation.

Heretofore the great objection to machines similar to my invention (and which has prevented them from coming into general use) has been; they would not cut the whole of the surface presented to the cutting disk, on account of not being able to clear the center. To obviate this difficulty, I have made the hopper and so arranged it on top of the disk that the knives, or bits will cut the whole of the surface presented to the disk, and a central removable curved, or auger shaped knife or bit, as described, which easily and perfectly clears the center.

In the drawings Figure 1, is a perspective view showing in part through a break, the interior of the machine. Fig. 2, is a side elevation showing the whole interior machinery. Fig. 3, is a side view of the machine when in operation. Fig. 4, is the top of the cutting disk. Fig. 5, is the presser used for pressing toward the disk, the material to be cut. Fig. 6, is a top view of the center removable curved, or auger shaped knife. Fig. 7, is a side view of said knife. Fig. 8, is the removable partition used in the hopper.

The nature of my invention consists in the combination and arrangement of the parts of a machine, for cutting ice, vegetables, meats and fruits. Also in the peculiar formation and arrangement of the central knife, or bit and top and hopper, and removable partition, as well as in making a machine that will cut rapidly from center to circumference, the whole surface presented to the cutting disk.

In Fig. 1, the machine is shown in perspective with top T, open and disk D, exposed, as also the cog wheels $b$, W, and $l\ w$, which are attached to the crank $c'$, shaft $x$, and the disk shaft $c$.

In Fig. 2, a side view of the machine is given exposing the interior and showing the action and use of all the parts including presser P, hopper H, disk D, spout S, case or frame C, hinges $i$, top T, fender F, cross piece $e$, $e$, cog wheels $b$, W, and $l$, $w$, and pin $p'$, slide S', and bottom $b'$, $b'$, of the presser P, and socket $s$ for the shaft $c$, to revolve on.

Fig. 4 shows the top of the revolving disk D, with the arrangement of its knives $k$, the central knife $c$, $k$, and the holes $t$, through the disk, placed there for the purpose of letting the cut material escape below into the spout S. The knife $c$, $k$, is made with a straight, or nearly straight edge with curves on each side so as to enable it to perform the operation of cutting and boring at the same time; thus keeping the center of the disk clear and enabling the knives $k$, to cut freely. The knife or bit $c$, $k$, has a plate like base, at each end of which a screw is inserted for the purpose of securing it to the disk, into which said plate like base is inserted so that its top is on a level with the face of the disk D, as shown. The knives, or bits $k$, are secured to the disk by screws $v$, shown at the bottom of the disk D; knives $k$, have slots in them so as to enable the operator to raise or lower them at pleasure. $e$, $e$, shows a central piece running across the machine through which the shaft $c$, runs and which prevents said shaft from oscillating giving it a steady motion.

Fig. 5, is the presser P, which has a handle $h'$, pin $p'$, slide S', bottom $b$, and on to the bottom a perforated piece of tin $p$, $p$. The bottom $b'$, of this slide is octagonal or septigonal, as shown, so as to fit in the hopper H, which is of the same shape. The slide S', is round, and larger than the hopper H, so that when the pin $p'$, rests upon it, it (the slide) may remain on top of the hopper H, and thus prevent the perforated plate $p$, $p$, from coming in contact with the knives. This presser, with its roughened bottom, is for the purpose of pressing the material to be cut to the cutting disk, and preventing the material from revolving with the knives. To assist in this the hopper H, is made in a septigonal, or an equivalent shape. This peculiar shape of the hopper, in combination with the central knife, enables the machine to cut the whole surface presented to its cutting disk.

The top T, with hopper attached, is made so as to open in order that the operator may the more readily remove the cutting disk when it it necessary to sharpen the knives. The cutting disk D, has a projection in the center on its bottom into which shaft $c$, fits; a pin $o$, fastens the said disk to its shaft; pin $o$, is removed when it is necessary to take the disk off. The knives $k$, can be set to cut fine or coarse. The partition shown in Fig. 8, is used when only small quantities of any material is to be cut, the hand is then used in place of the presser. $h$, is a hook used for fastening down top and hopper. $r$, a pin over which hook $h$, is placed. The fender F, top T, and hopper H, may be made in one piece and of cast iron, hinged to the case C. This fender is to confine the cut material within proper limits, as the rapid revolution of the disk would scatter it outside the machine.

What I claim and desire to secure by Letters Patent, is—

The peculiar shaped and arranged central bit or knife $c$ $k$, in combination with the revolving disk D presser P and hopper H, or with apparatus substantially the same for the purpose specified.

WM. H. HOPE.

Witnesses:
 JOHN T. HOLOHAN,
 E. W. JONES.